US005653522A

United States Patent [19]
Loucks

[11] Patent Number: 5,653,522
[45] Date of Patent: Aug. 5, 1997

[54] DISPLAY PANEL MOUNT FOR PROJECTION DISLAY SYSTEM

[75] Inventor: Bryan E. Loucks, Los Altos Hills, Calif.

[73] Assignee: Kopin Corporation, Taunton, Mass.

[21] Appl. No.: 285,955

[22] Filed: Aug. 4, 1994

Related U.S. Application Data

[63] Continuation-in-part of Ser. No. 111,171, Aug. 25, 1993, abandoned.

[51] Int. Cl.⁶ .................................................. G03B 21/14
[52] U.S. Cl. .................................................. 353/122; 353/31
[58] Field of Search .................................. 353/122, 33, 34, 353/81; 359/83

[56] References Cited

U.S. PATENT DOCUMENTS 5,357,289  10/1994  Konno et al. ........................ 353/33

FOREIGN PATENT DOCUMENTS

| 595 372 A2 | 12/1990 | European Pat. Off. . |
| 450 952 A3 | 4/1991 | European Pat. Off. . |
| 526 652 A1 | 2/1992 | European Pat. Off. . |
| 1267587 | 10/1989 | Japan . |
| 3296735 | 12/1991 | Japan ........................................ 353/31 |
| 4206331 | 7/1992 | Japan . |
| 89/09422 | 10/1989 | WIPO . |

*Primary Examiner*—William Dowling
*Attorney, Agent, or Firm*—Hamilton, Brook, Smith & Reynolds, P.C.

[57] ABSTRACT

Liquid crystal display panels are mounted to a beam combining prism such that each display panel can flex in the place of the display panel as a result of thermal stresses. A three-point clip mount for each display panel is bonded between the prism and the display panels.

22 Claims, 8 Drawing Sheets

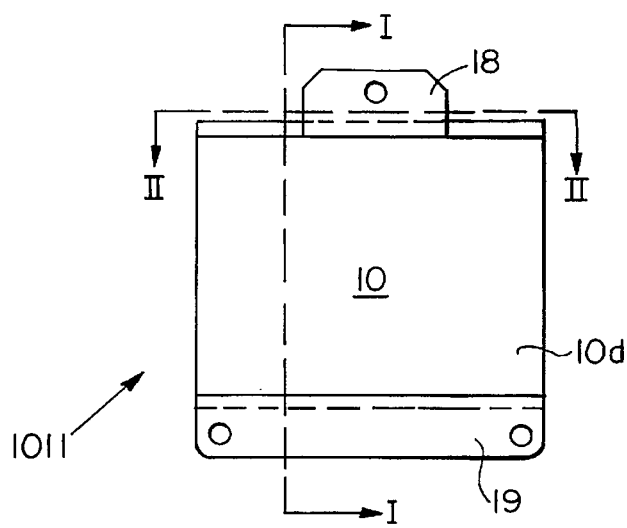
FIG. 1A
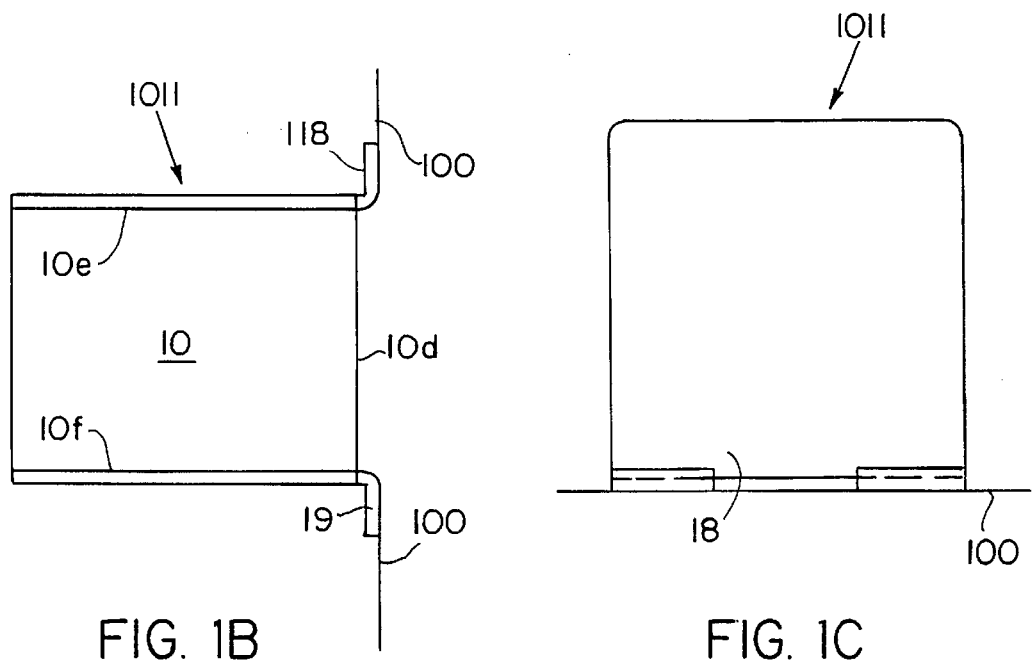
FIG. 1B
FIG. 1C
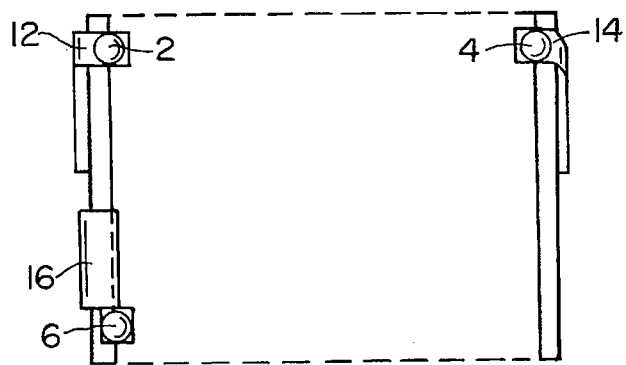
FIG. 2

DISPLAY PANEL MOUNT FOR PROJECTION DISLAY SYSTEM

RELATED APPLICATIONS

This application is a continuation-in-part of Ser. No. 08/111,171 by Bryan E. Loucks filed Aug. 25, 1993 and now abandoned, and entitled "Display Panel Mount For Projection Display System," the teachings of which are incorporated herein by reference.

BACKGROUND OF THE INVENTION

A color image can be synthesized by combining discrete primary color images (e.g., red, green and blue). In display systems using liquid crystal display panels, each primary color image can be generated by a respective display panel. The primary color images are then combined by an optical combiner to form a synthesized color image.

To synthesize an accurate color image, the display panels must be precisely aligned with respect to each other. The display panels must also be precisely aligned with the optical axis of the optical combiner. These alignments cannot be predetermined because there is a large tolerance in the optical properties of individual display panels.

In typical projection display systems using display panels, the display panels are fixed to a supporting structure of the display system. The beam combiner is then inserted in the optical path of the display panels. Such systems cannot be aligned until the display panels and beam combiner are fixed to the display system. Such systems contain many mechanical parts to facilitate image alignment between the optical combiner and the display panels. Assembly workers must have adequate skills to achieve the alignment after assembling the display system.

In projection display systems, the display panels are subjected to thermal stress, which can misalign the display panels. A spatial misalignment of the display panels relative to each other or to the optical axis of the optical combiner can degrade the synthesized image.

SUMMARY OF THE INVENTION

Preferred embodiments of the invention are directed to projection display systems using light valve display panels to generate images. In particular, the light valve display panels are active matrix liquid crystal display panels. The active matrix circuitry is preferably fabricated on a single semiconductor wafer. In a preferred embodiment, the display panels are approximately the size of a standard 35 mm photographic slide. As will be apparent, the utility of the invention is applicable to other display panels, including Electroluminescent (EL) display panels, Light-Emitting Diode (LED) arrays, and flexing mirror pixel light valves. Furthermore, the display panel size is not limited to the 35 mm format, other dimensions and aspect ratios can also be used in practicing the invention.

In a preferred embodiment, three display panels are mounted to and aligned with a beam combiner so that when images produced on the display panels are projected onto a screen, the resulting image is in focus and registration for all colors. A preferred embodiment benefits from a low product component cost, a compact assembly, and an alignment process that requires no subjective decisions on the part of a person performing the alignment.

In general, a preferred beam combiner sub-assembly consisting of three display panels attached to a beam combining prism and aligned so that from a projection lens all three display panels and the lens are on a common optical axis and aligned laterally and rotationally about the optical axis to a common orientation. This sub-assembly has appropriate reference surfaces to orient the sub-assembly properly relative to a projection lens and an illumination system without requiring any further adjustments.

A preferred embodiment of the invention is a light valve display system containing light valve display panels and a beam combiner sub-assembly. A plurality of light valve display panels generate respective images and the beam combiner combines the images to form a synthesized image. Each light valve display panel is mounted to the beam combiner by a three point mount.

The three points define a display panel image plane. Mounting clips provide for expansion of each display panel in response to thermal stress. Each display panel can expand in a direction normal to the optical axis of the respective display panel. Because the display panels are in close proximity to each other, the display panels function in a shared environment. As such, the temperature of each display panel will be substantially equal to the temperature to the other display panels. Thus, each display panel will be subjected to equivalent amounts of thermal stress. Consequently, the display panels will expand an equal amount in response to the thermal stress.

A mounting contact point is located near a respective corner of each display panel. A first structure at the inner contact point is rigid in all directions. A second structure at each of the adjacent outer contact points is rigid in one direction in the image plane and flexible in the other direction in the image plane. The corner of the display panel that is diagonal to the first structure is unsupported.

By mounting aligned display panels to the optical combiner, a complete display panel assembly is fabricated. Such an assembly permits the use of smaller beam combiners and display panels than can be used in prior art systems. In addition, the number of mechanical parts that must be supplied with each projection display system and the skill level required to assemble projection display systems is reduced over prior art systems.

The beam combiners can be single reflection beam combiners or multi-reflection beam combiners. Single reflection beam combiners reflect light rays passing through the beam combiner from the display panels at most once. Multi-reflection beam combiners reflect the light ray passing through the beam combiner from at least one display panel a plurality of times. The beam combiners can be fabricated with either unitary reflective surfaces which do not intersect or split reflective surfaces which intersect at a joint. In other words, a unitary reflective surface is a reflective surface (i.e., mirror) that is not segmented.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular display panel mount embodying the invention is shown by way of illustration only and not as a limitation of the invention. The drawings are not necessarily to scale, emphasis instead being on illustrating principles and features of the invention. The principles and features of this invention may be employed and varied in numerous embodiments without departing from the scope of the invention.

FIGS. 1A–1C are schematic diagrams of a beam combiner assembly.

FIG. 2 is a schematic diagram illustrating mounted image plane mounting clips.

DETAILED DESCRIPTION OF A PREFERRED EMBODIMENT OF THE INVENTION

Figure 3A:
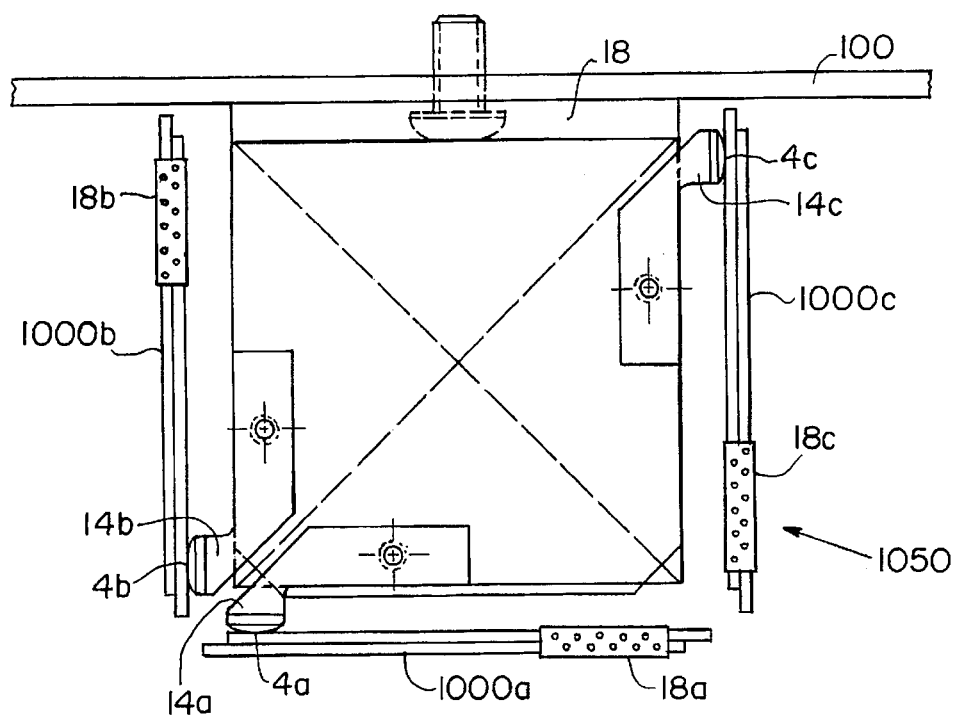
FIGS. 3A–3B are schematic diagrams of a completed display panel and beam combiner assembly.

FIGS. 1A–1C are schematic diagrams illustrating a beam combining prism 10 and mounting brackets 18, 19 bonded together. The prism 10 does not have any means of mounting or any reference surfaces except four polished faces 10a, 10b, 10c and 10d. The beam combining prism 10 can have any aspect ratio or orientation. In a specific embodiment, a marking indicates which three faces 10, 10b, 10c are input faces and which faces 10d is the output face. A fixture is used to hold the prism 10 in a particular orientation relative to a reference surface 100 on the fixture. The same fixture also locates two metal mounting brackets 18, 19 to capture the prism. The brackets are parallel to the two non-polished surfaces 10e, 10f of the prism. In this fixture, the two mounting brackets 18, 19 are cemented to the prism 10. The adhesive used to cement the mounting brackets 18, 19 to the prism 10 can be chosen from a variety of adhesives commonly used in the optical industry to bond metal to glass.

FIG. 1A is a front view of a beam combiner sub-assembly 1011 showing a reference surface 100. As discussed below, the final display panel assembly is coupled to a projection display system at the reference surface 100. Holes in the mounting brackets 18, 19 are locational and holding provisions. The reference surface 100 is parallel to the output face 10d of the prism 10. FIG. 1B is a schematic diagram of the beam combiner sub-assembly 1011 taken along line I—I of FIG. 1A. FIG. 1C is a schematic diagram of the beam combiner sub-assembly 1011 taken along line II—II of FIG. 1A. As illustrated, the mounting brackets 18, 19 cover respective unpolished faces 10e, 10f of the prism 10. It is understood that less than full coverage can be obtained without affecting the scope of the invention.

After the prism 10 has been bonded to the metal mounting brackets 18, 19, image plane mounting clips 12, 14, 16 (shown in FIG. 2) are attached to the mounting brackets 18, 19. The purpose of the clips 12, 14, 16 is to provide an image plane established by three points for each display panel 1000. Each image plane must be optically perpendicular to the reference plane 100 established by the mounting brackets 18, 19 holding the prism 10. In addition to being perpendicular to the optical axis, the image planes must also be located at the same optical distance along the optical axis relative to the reference plane 100.

In a projection display system, the projection lens may suffer from lateral color displacement. The lateral color displacement can be corrected by altering the magnification of the display panel image. Given a projection lens, the displacement of the image plane from the optimal focal point can be calculated for each color image. This displacement can then be used to adjust displacement between each display panel 1000 and the associated input face of the prism 10.

The correction for lateral color displacement is a compromise between focus and magnification. In a preferred embodiment of the invention, the displacement from optimal focus is less than 0.5 mm. In addition, correction of lateral color displacement of telocentric lenses may substantially degrade the focus of the synthesized image.

The mechanism for transferring the located image planes to the mounting brackets 18, 19 of the beam combining prism 10 consist of three clips, the image plane mounting clips 12, 14, 16. Each clip 12, 14, 16 has a flat surface to be bonded to a prism mounting bracket 18, 19 and a spherical surface to be bonded to a display panel 1000. Three clips 12, 14, 16 are used for each display panel 1000. The clips 12, 14, 16 are mounted to the prism mounting brackets 18, 19 so the spherical surfaces are in contact with the display panel 1000 and positioned so they contact the display panels 1000 near three of the four corners when they are installed. Three contact points are used to avoid stressing the display panels 1000 when they are mounted.

Of the three clips 12, 14, 16 used for each display panel 1000, a first clip 12 is designed to be stiff along the display panel surface in all directions, a second clip 14 is stiff in one direction in the image plane and slightly flexible in the perpendicular direction in the image plane, and a third clip 16 is flexible and stiff in the opposite directions to the second clip 14. This clip stiffness pattern permits the display panel 1000 to be mounted so the first clip 12 establishes the location of the display panel 1000 while the other two clips 14, 16 provide support for the display panel 1000 but permit some slight differential thermal expansion during warmup. This differential expansion occurs because the thermal conductivities of the glass and the metal component are different, even if the thermal expansion coefficients are about equal. The differential expansion for each display panel 1000 should be substantially equal to the differential expansion in each other display panel 1000 in a completed assembly because the display panels 1000 experience substantially the same thermal stress. The display panels 1000 experience the same thermal stress because to the display panels 1000 function in a common environment due to the close proximity of the display panels.

FIG. 2 illustrates the mounted positions of the image plane mounting clips 12a, 14a, 16a for one input face 10a of the beam combining prism 10. It should be noted that the positioning of the image plane mounting clips 12, 14, 16 for all three input faces 10a, 10b, 10c must be aligned such that the projection of each image plane mounting clip 12, 14, 16 aligns with the corresponding image plane mounting clips 12, 14, 16. In other words, all projections of the first clips 12 must align with each other, all projections of second clips 14 must align with each other, and all projections of third clips 16 must align with each other.

In a preferred embodiment, the clips 12, 14, 16 are pivot-mounted to the mounting brackets 18, 19 and the clips 12, 14, 16 are pivoted into position. When this contact is achieved, the clips 12, 14, 16 are bonded to the mounting brackets 18, 19. The clips can be bonded to the mounting brackets 18, 19 by a variety of methods, including either spot welding or ultraviolet-activated structural adhesive bonding. In a preferred embodiment, the adhesive is locktite Improved 365.

Each clip 12, 14, 16 has a respective spherical contact surface 2, 4, 6 to make contact with the display panel 1000. If the display panels 1000 were to be fastened to the clips 12, 14, 16 at this point in the process, an image would appear on the screen that was in good focus over the whole area and for each color. However, the image may require registration between the image and screen boundaries or of color to color. Registration of the images requires the ability to move the display panels 1000 in the plane of the display panel image. This registration can be performed one light path at a time.

Figure 3B:
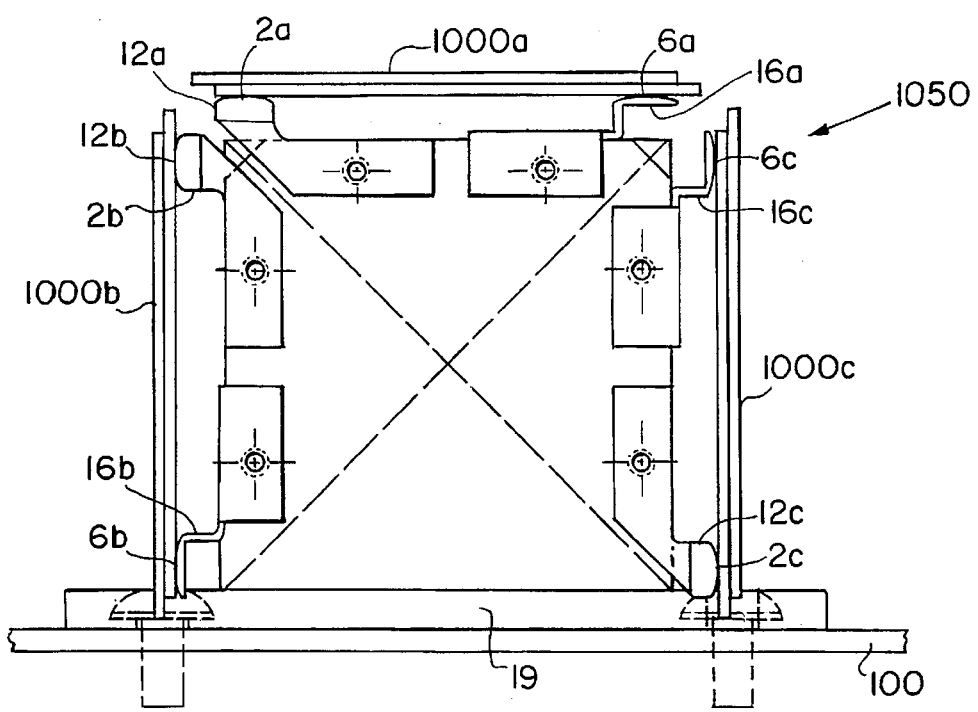

FIGS. 3A–3B illustrate a completed assembly 1050 of display panels 1000, beam combining prism 10, and mounting brackets 18, 19. Illustrated are three display panels 1000a, 1000b, 1000c mounted to the beam combiner assembly 1011 by respective clips 12, 14, 16. For purposes of clarity in the drawings, each view illustrates only those clips 12, 14, 16 that are in the foreground. Thus, it may appear that some edges of the display panels 1000 are unsupported. However, only one corner of each display panel 1000 is in fact unsupported.

FIG. 3A is a plan view of the display panel assembly 1050 facing the first mounting bracket 18. As illustrated, the respective second mounting clips 14 fixed to the first mounting bracket 18. Not shown are the first mounting clips 12 and third mounting clips 16. Also illustrated are cable connections 18a, 18b, 18c extending from the drawing sheet at the available (no clip) side of each display panel 1000a, 1000b, 1000c.

FIG. 3B is a plan view of the display panel assembly facing the second mounting bracket 19. As illustrated, the respective first mounting clips 12 and third mounting clips 16 are fixed to the second mounting bracket 19. Not shown in FIG. 3B are the second mounting clips 14.

The use of a spherical surface 2, 4, 6 at the display panel/clip interface is useful for more than just establishing three points to form the display panel image plane. When the display panel 1000 is bonded to a clip, the bond line at the contact point is close to zero thickness. If this were the only bond point, the joint would probably fail with temperature cycling because there would be no adhesive thickness to distribute the shear forces between the display panel 1000 and clip. The spherical surface 2, 4, 6 provides a varying thickness of adhesive to survive such shear forces.

The above-described alignment mechanism is in the tool at the factory and is not part of the fixture. After the alignment has been achieved for all three display panels 1000, an ultraviolet curing adhesive that was put on the spherical surfaces 2, 4, 6 of the image plane mounting clips 12, 14, 16 is cured. This sets the clips 12, 14, 16 so they are no longer adjustable. The clips 12, 14, 16 no longer have any sensitivity to motion and are installed as a pre-aligned subsystem into an optical system.

Figure 4:
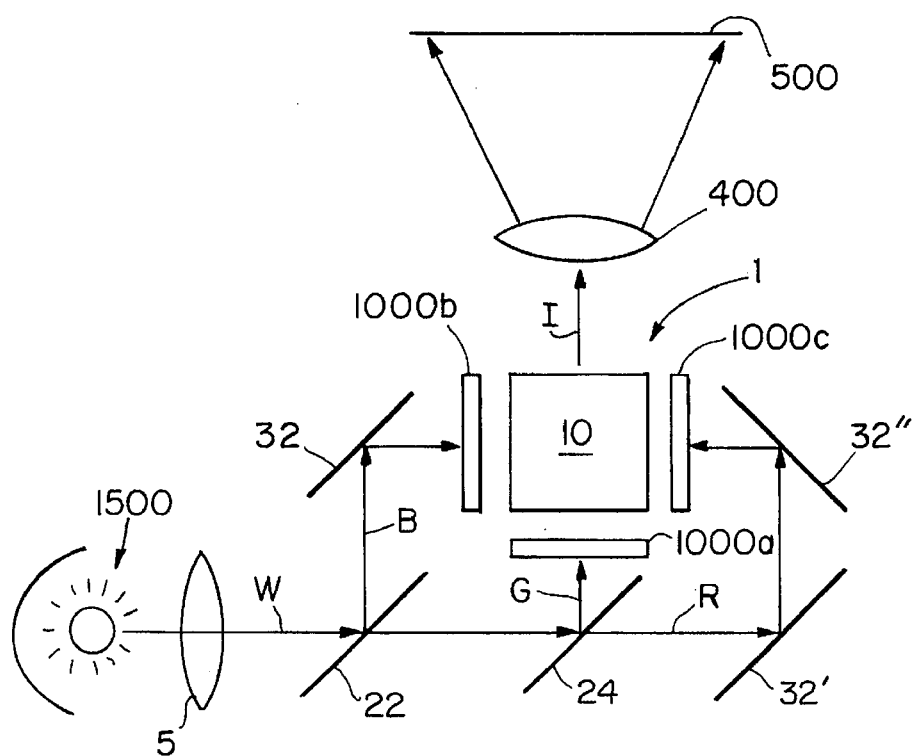
FIG. 4 is an optical diagram of a completed display panel assembly integrated into a projection display system.

FIG. 4 is an optical diagram of a preferred display panel assembly 1 integrated into a projection display system. The projection display system includes a light source 1500 and a projection lens 400. White light W from the light source 1500 is focused by a lens 5 and transmitted toward a dichroic mirror pair and reflection mirrors. The dichroic mirror pair includes a blue light reflection dichroic mirror 22 and a green light reflection dichroic mirror 24. The dichroic mirror pair segregates the light from the light source 1500 into primary colors. Blue light B reflected by the blue light reflection dichroic mirror 22 is reflected by a first mirror 32 and becomes incident on a first display slide 1000b. The green light reflection dichroic mirror 24 reflects green light G toward a second display panel 1000a. The remaining red light R is reflected by a second mirror 32' toward a third mirror 32" which reflects the red light toward third display panel 1000c. The synthesized red-green-blue (RGB) image I is outputted by the beam combiner 10 of the display panel assembly 1050. The RGB image is projected by the projection lens 400 onto a viewing screen 500. Further details regarding preferred projection displays can be found in International Patent Application Serial No. PCT/US94/01549 by Ronald P. Gale et al., filed on Feb. 10, 1994, and entitled "Projection Monitor," the teachings of which are incorporated herein by reference.

The prism 10 of FIG. 4 is a single reflection X-type beam combiner having split mirrors. Because the mirrors are segmented into two halves, the X-type beam combiner does not have a unitary reflective surface. Such a beam combiner offers the advantages of being compact, fabricated from glass and having a short back focus. In addition, there is no interference between the display panels 1000a, 1000b, 1000c. The X-type beam combiner suffers the disadvantages of being relatively expensive and the split mirrors require a tight tolerance. In addition, four pieces must be aligned and one of the display panels 1000b must be a mirror image of the other display panels 1000a, 1000c.

The above-described alignment scheme can also be used with filter plates instead of prisms. In such a mechanism, two filters and one mirror must be firmly and permanently mounted to a fixture. The fixture can then be used to hold the three slides.

Figure 5B:
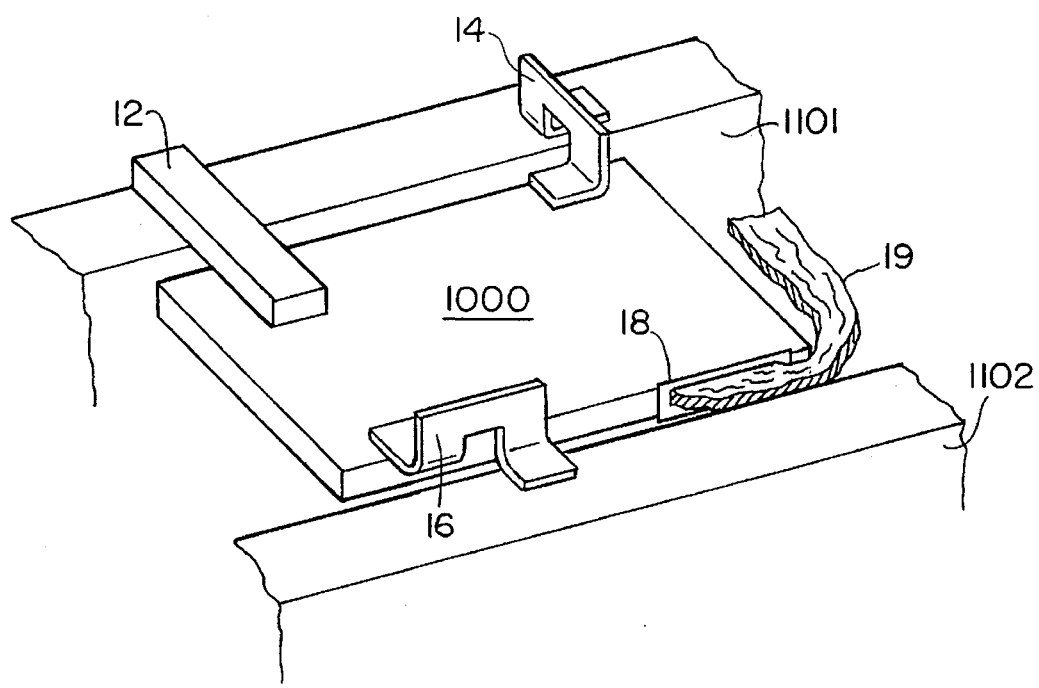
FIG. 5B is a perspective view of a display panel mounted to a frame of the projection display system of FIG. 5A.
Figure 5A:
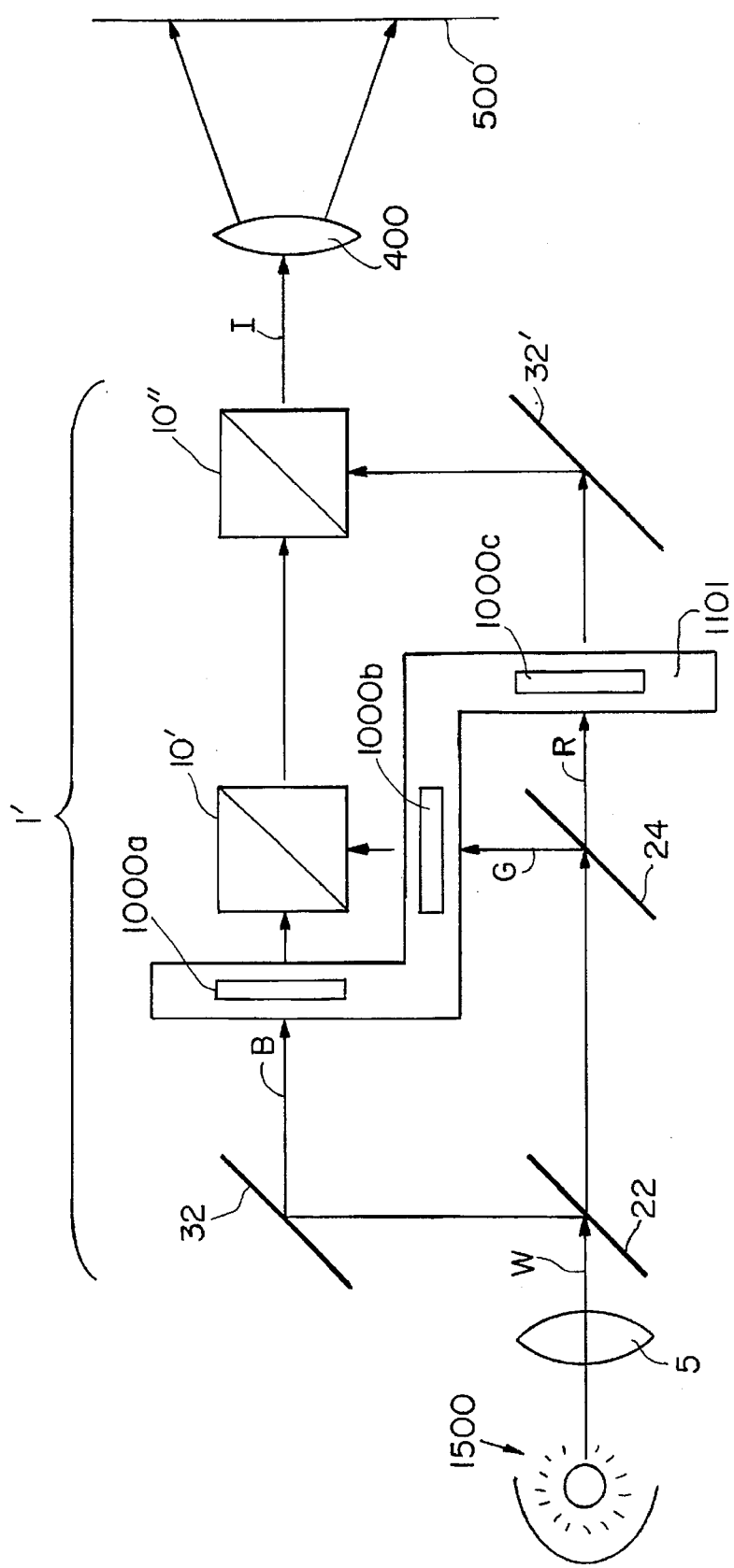
FIG. 5A is an optical diagram of another light valve system.

FIG. 5A is an optical diagram of another preferred light valve system 1'. As illustrated, white light W from a light source 1500 is focused on a blue reflecting dichroic mirror 22 by a lens 5. The blue light B is reflected by a first mirror 32 and passes through a first display panel 1000a and enters a first beam combiner 10' having a unitary reflective surface. Light passed by the blue light reflecting dichroic mirror 22 is split by a green light reflection dichroic mirror 24. The reflected green light G passes through a second display panel 1000b and enters the first beam combiner 10'. The passed red light R passes through a third display panel 1000c and is reflected by a second mirror 32'. A second beam combiner 10" having a unitary reflective surface combines the red light R and the combined blue B and green light G from the first beam combiner 10' to synthesize the RGB image I. The RGB image is projected by the projection lens 400 onto a viewing surface 500.

FIG. 5B is a perspective view a display panel 1000 mounted to a frame of the projection display system of FIG. 5A. As illustrated, the display panel 1000 is mounted to the first and second supporting frames 1101, 1102. A flexible cable connector 18 is shown with its associated flexible cable 19. The slide 1000 is mounted by image plane mounting clips 12, 14, 16. The clips 12, 14, 16 provide three contact points defining the image plane and flex in the same manner described above.

Such a mechanism offers the advantage of being lightweight and being fabricated from inexpensive single reflection components. The disadvantages include a long back focus, alignment instability, and not being self supported. Astigmatism is also possible. In addition, there is interference between the display panels 1000a, 1000b, 1000c and one display panel 1000b must be a mirror image of the other display panels 1000a, 1000c.

Although the clips 12, 14, 16 have been illustrated as being fixed to a mounting bracket, it should be understood that the clips can be adhered to a beam combiner directly using a metal to glass adhesive. The beam combiner can be a beam combining prism 10 or any other type of optical beam combiner employed in direct view, screen projection or rear projection video systems. For example, a particular preferred projector is disclosed in U.S. Ser. No. 08/254,276 by Ronald P. Gale et al., filed Jun. 3, 1994 and now U.S. Pat. No. 5,550,604 and entitled "Compact High Resolution Light Valve Projector," the teachings of which are incorporated herein by reference.

Figure 6:
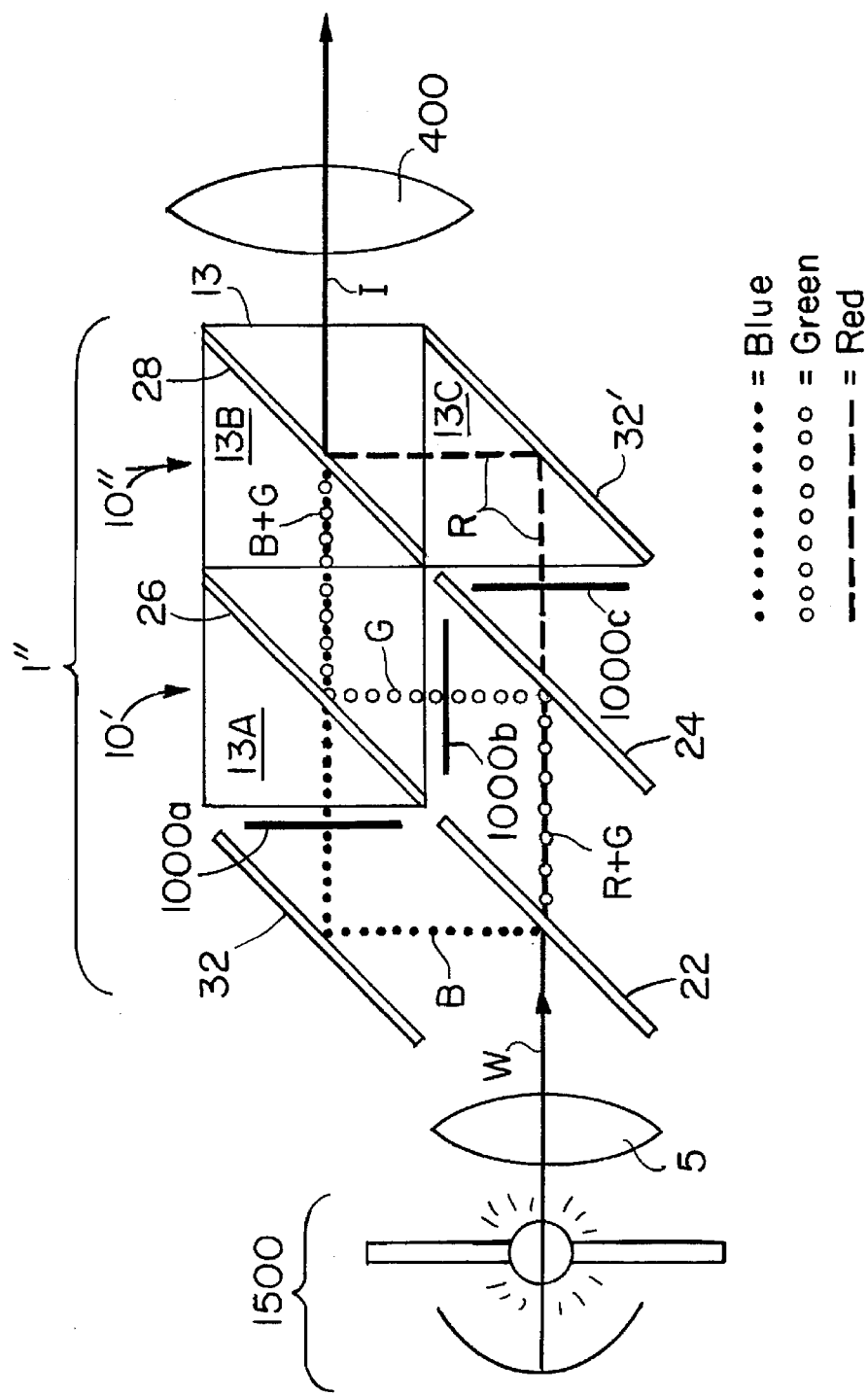
FIG. 6 is a schematic diagram of a light valve system in accordance with a preferred embodiment of the invention.

FIG. 6 is a schematic diagram of a light valve system 1" in accordance with a preferred embodiment of the invention. The output of a light source 1500 is focused by a lens 5, resulting in a beam of white light W. The beam W enters the light valve system 1 where the beam W comes in contact with a first dichroic mirror 22 which reflects blue light B and allows red light R and green light G to pass through. The blue light beam B reflects off a first mirror 32 and passes through a blue light valve 1000a. The output of the blue light valve 1000a is directed through a first dichroic prism 13A having a unitary reflective surface. The red light R and green light G passing through dichroic mirror 22 comes in contact with a second dichroic mirror 24 where the green light G is reflected and the remaining red light R passes through. The green light beam G passes through a green light valve 1000b and enters the first dichroic prism 13A where it is reflected and joins with the output of the blue light valve 1000a, the combination of blue B and green G modulated light is directed through a second dichroic prism 13B having a unitary reflective surface. The red light R passing through dichroic the second dichroic mirror 24 thereafter passes through a red light valve 1000c, reflects off a second mirror 32' and enters the second dichroic prism 13B where the red light R joins with the blue and green light output B+G of the first dichroic prism 13A, resulting in a color output image I which is focused by projection lens 400.

Source 1500 is preferably a xenon or metal halide arc lamp having a color temperature in the range between 4000 and 9000 degrees and having an arc gap of less than 2 mm, and preferably in the range of 1.0–1.6 mm. The smaller arc lamp provides for the capture of a higher percentage of the output light. The use of a small diameter reflector that is about 75 mm in outer diameter or less in a preferred embodiment fits within a compact housing.

Dichroic mirrors 26 and 28 can be made as shown in FIG. 6 using cube prisms 13A, 13B on which light valves 1000a and 1000b are mounted. Cube 13A has two prism elements that are cemented together using optically transparent cement and a thin film dichroic coating 26 that combines the blue and green components of the generated image. Similarly cube 13B has dual components that form a dichroic prism at a thin film dichroic coating 28, which combines the blue and green component with the red component. Mirror 32' is formed on the side of glass element 13C. The adjacent faces of glass elements 13A, 13B and 13C are bonded together as shown and provide a rigid structure on which the light valves 1000a, 1000b, 1000c are mounted to provide an efficient mechanism for aligning the three valves.

The beam combiner 13 of FIG. 6 is a multi-reflection three-prism type beam combiner having unitary reflective surfaces. Such a beam combiner offers the advantages of being fabricated from glass and being easy to manufacture. The three-prism type beam combiner suffers the disadvantages of having a long back focus. In addition, there is some interference between the display panels 1000a, 1000b, 1000c and one display panel 1000b must be a mirror image of the other display panels 1000a, 1000b.

Figure 7:
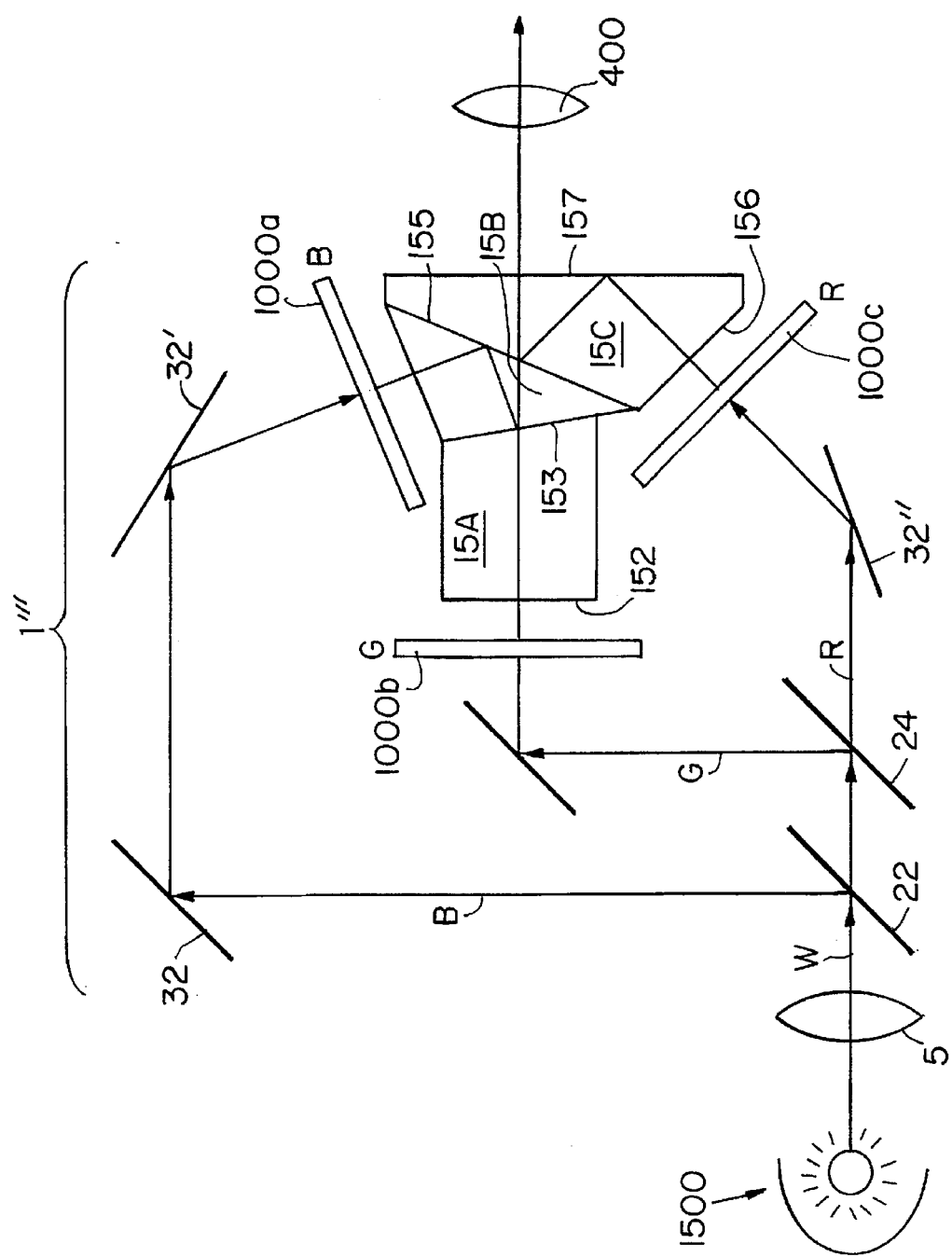
FIG. 7 is a schematic diagram of another light valve system in accordance with the preferred embodiment of the invention.

FIG. 7 is a schematic diagram of another light valve system 1''' in accordance with the preferred embodiment of the invention. The output of a light source 1500 is focused by a lens 5, resulting in a beam of white light W. The white light W enters the light valve system 1' where the white light W comes in contact with a first dichroic mirror 22, which reflects blue light B and allows red light R and green light G to pass through. The blue light beam B reflects off a first mirror 32 and a second mirror 32' and passes through a blue light valve 1000a. The output of the blue light valve 1000a is directed toward a Philips-type optical beam combiner 15. The red light R and green light G passing through the first dichroic mirror 22 comes in contact with a second dichroic mirror 24, where the green light G is reflected and the remaining red light R passes through. The green light G is reflected by a third mirror 32" and through a green light valve 1000b. The output of the green light valve 1000b is directed to the optical beam combiner 15. The remaining red light R from the second dichroic mirror 24 is reflected by a fourth mirror 32''' through a red light valve 1000c. The output of the red light valve 1000c is directed toward the optical beam combiner 15. The optical beam combiner 15 combines the outputs from the light valves 1000a, 1000b, 1000c into a registered color image I which is focused by projection lens 400 onto a viewing surface.

The Philips-type optical beam combiner 15 is a prism fabricated from three glass segments bonded together by a thermalsetting adhesive. A first segment 15A processes light from the green light valve 1000d, a second segment 15B combines the light from the blue light valve 1000a with the light from the green light valve 1000b, and a third segment 15C combines the output of the red light valve 1000c with the outputs of the green light valve 1000b and blue light valve 1000a. The Philips-type optical beam combiner 15 is preferably optimized for a particular application. The optical path length is optimized to the exact size of the display panels 1000a, 1000b, 1000c and the type of glass. This optimization yields angles for the prism.

In detail, the green light G enters the optical beam combiner 15 at a first face 152, the blue light B enters the beam combiner 15 at a second face 154 and the red light R enters the beam combiner 15 at a third face 156. The green light is transmitted through the first segment 15A to a first unitary dichroic interface 153 with the second segment 15B. The green light is transmitted through the second segment 15B to a second unitary dichroic interface 155 with the third segment 15C.

The blue light B is reflected from the second interface 155 back through the second segment 15B to the first interface 153. The first interface 153 combines the blue light with the green light and reflects the blue light toward the second interface 155.

The red light R is reflected by the unitary exit face 157 back through the third segment 15C to the second interface 155 where the red light is combined with the blue light B and green light G from the second segment 15B. The second interface 155 reflects the red light toward an exit face 157 with the blue light B and green light G transmitted through the segment interface 155. Upon exiting at the exit face 157 of the optical beam combiner 15, the red, blue and green light are registered to form a full color image I.

The Philips-type beam combiner 15 of FIG. 7 is a multi-reflection beam combiner having unitary reflective surfaces that offers the advantages of being fabricated from all glass and being easy to manufacture. In addition, there is no interference between and no mirror imaging of the display panels 1000a, 1000b, 1000c. As a disadvantage, the Philips type beam combiner 15 has a long back focus.

Figure 8:
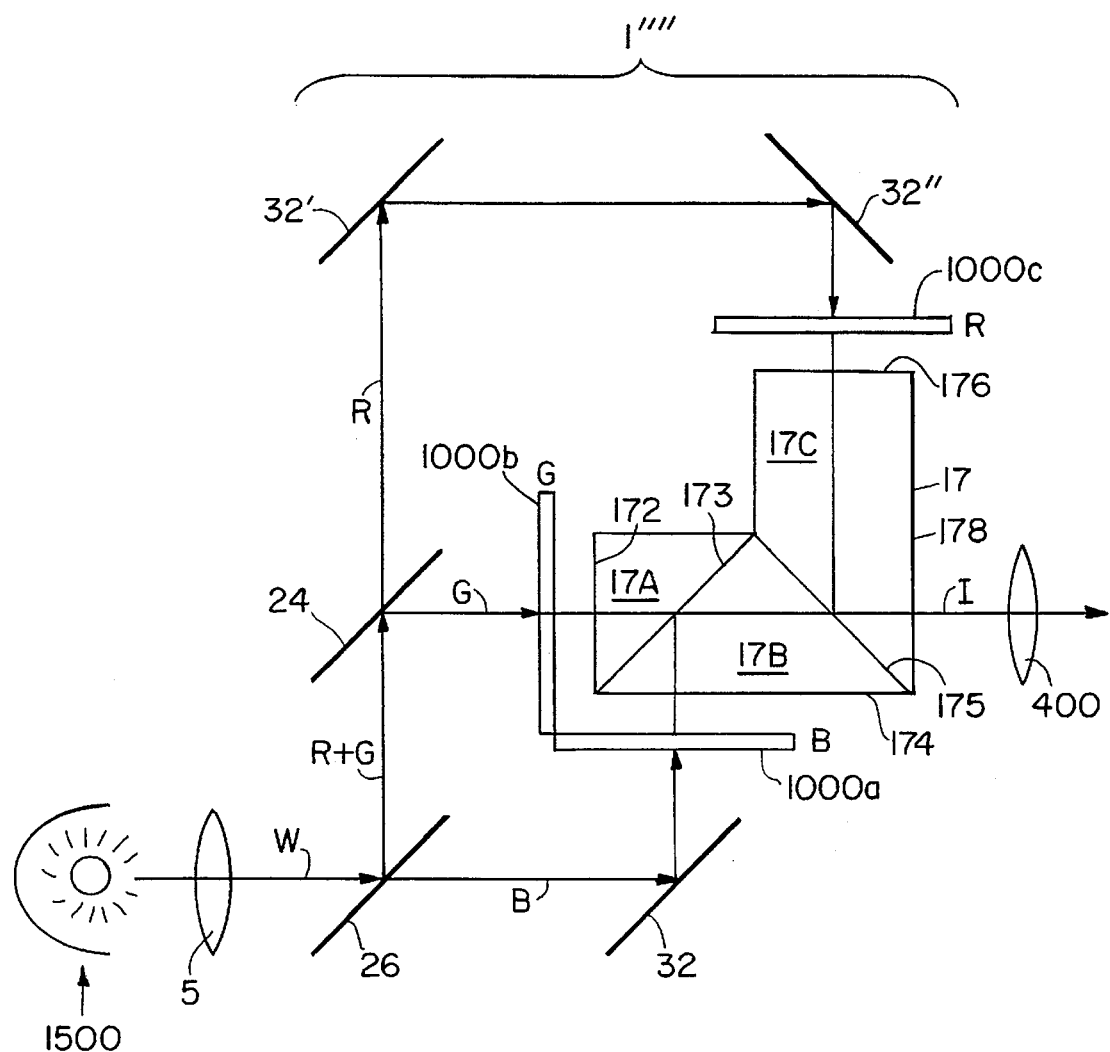
FIG. 8 is a schematic diagram of yet another optical system in accordance with a preferred embodiment of the invention.

FIG. 8 is a schematic diagram of yet another optical system 1''' in accordance with a preferred embodiment of the invention. The white light W from the light source 1500 and lens 5 is split by a first dichroic mirror 26 into blue light B and red and green light (R+G). The blue light is reflected by a first mirror 32 through a blue light valve 1000a. The red and green light (R+G) is processed by a second dichroic mirror 24 into red light R and green light G. The green light G is reflected by the second dichroic mirror 24 through a green light valve 1000b. The red light R passes through the second dichroic mirror 24 and is reflected by a second mirror 32 and a third mirror 32" through a red light valve 1000c. The output from the light valves 1000a, 1000b, 1000c are combined by an optical beam combiner 17 to produce a full color image I which is focused by a projection lens 400 onto a viewing surface. The optical beam combiner 17 includes three segments 17A, 17B, 17C connected together by an adhesive to form an L-shaped element.

The green light G enters a first segment 17A through a first face 172. The blue light enters a second segment 17B through a second face 174. The red light R enters a third segment 17C through a third face 176. The combined and registered red, green and blue light exit the beam combiner 17 at an exit face 178.

The first segment 17A meets the second segment 17B to form a first unitary dichroic interface 173. The first dichroic interface 173 passes green light and reflects blue light. The second segment 17B interfaces with the third segment 17C to form a second unitary dichroic interface 175. A second dichroic interface reflects red light R and passes the blue light B and the green light G. The second dichroic interface 175 forms the color output image I.

The right angle beam combiner 17 of FIG. 8 is a single reflection beam combiner having unitary reflective surfaces that offers the advantages of being fabricated from all glass and being easy to manufacture. In addition, there is no interference between the display panels 1000a, 1000b, 1000c. The right angle beam combiner 17 suffers the disadvantages of having a long back focus. In addition, one display panel 1000b must be a mirror image of the other display panels 1000a, 1000c.

Figure 9:
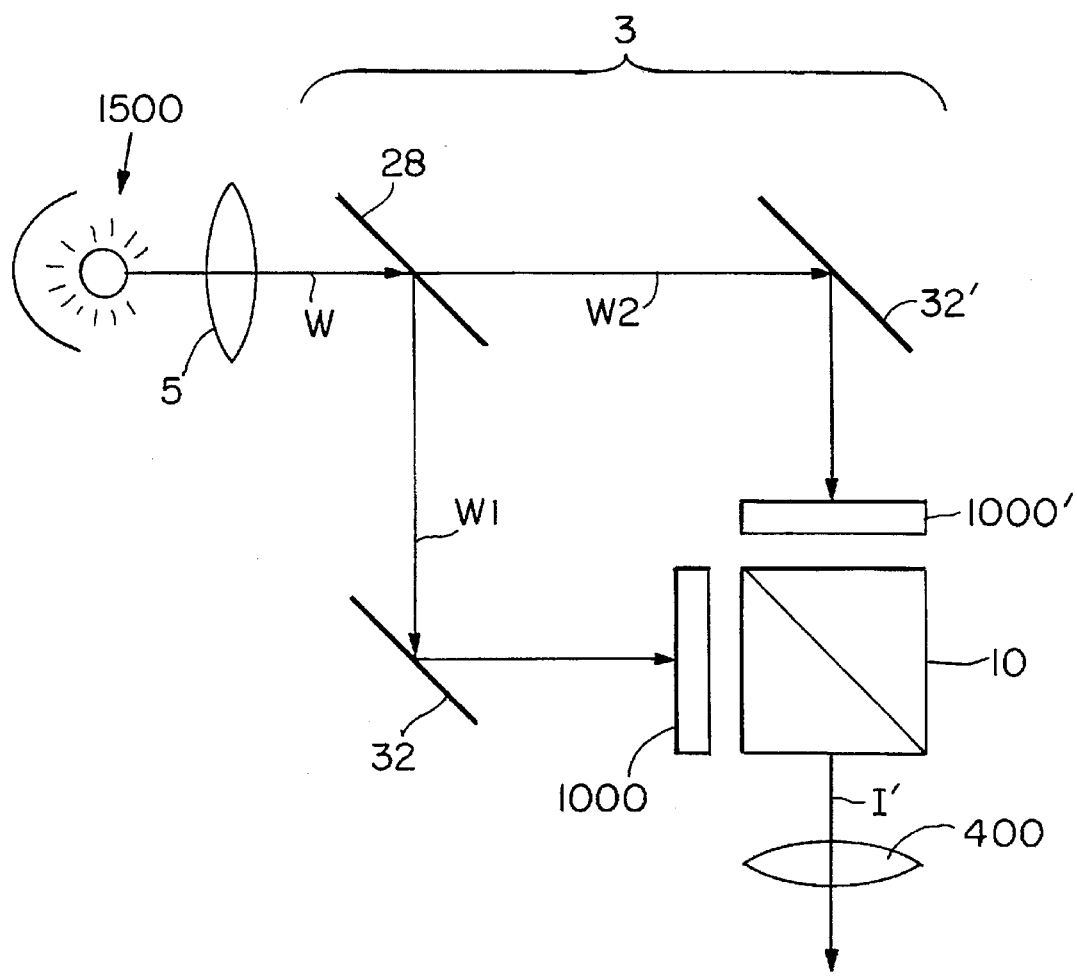
FIG. 9 is a schematic diagram of a redundant monochrome optical system in accordance with a preferred embodiment of the invention.

FIG. 9 is a schematic diagram of a redundant monochrome optical system in accordance with a preferred embodiment of the invention. A lens 5 focusses light from a light source 1500 into a beam of white light W. The beam of white light W is split by a single reflection beamsplitter 28 having a unitary reflective surface into two equal intensity sub-beams of white light W1, W2. Each sub-beam of white light W1, W2 is reflected from a respective mirror 32, 32' toward a respective light valve 1000, 1000'. The output from the light valves 1000, 1000' is processed by a dichroic prism 10 to yield a registered monochrome image I', which is focused onto a viewing surface by a projection lens 400.

Because the image from one of the light valves 1000 is reflected by the combining prism 10, the images on the two light valves 1000, 1000' must be mirror images of each other for there to be registration within the beam combiner 10. Preferably, the light valves 1000 are drive-to-white light valves so that if one light valve fails then the failed light valve will be black so that it does not wash out the image formed on the operating light valve.

Because the beam combiners have inherent polarizing characteristics and can be fabricated to enhance those characteristics, polarizers are not necessarily required in preferred embodiments of the invention. Alternatively, a polarizer layer is laminated onto the face of each display panel closest to the beam combiner. Preferably, there is a cut-out of each corner in contact with the clips 12, 14, 16 so the clips can be bonded directly to the glass of the display panel 1000. This is because it is more difficult to choose adhesives that bond to the polarizer than to the glass.

Equivalents

Those skilled in the art will know, or be able to ascertain using no more than routine experimentation, many equivalents to the specific embodiments of the inventions described herein.

These and all other equivalents are intended to be encompassed by the following claims.

The invention claimed is:

1. A display system comprising:
   a plurality of N display panels for generating respective images;
   an N-to-1 beam combiner having a plurality of unitary reflective surfaces and an optical axis for optically combining the N generated images to form a synthesized image; and
   a plurality of three-point mounts, each display panel fixed in an image plane relative to the optical axis of the beam combiner by a respective three-point mount, each three-point mount arranged to permit movement of the respective display panel relative to the beam combiner during operation of the display system.

2. The display system of claim 1 wherein N equals three, a first display panel generating a red-color image, a second display panel generating a green-color image, and a third display panel generating a blue-color image.

3. The display system of claim 1 wherein the display panels are active matrix liquid crystal display panels.

4. The display system of claim 1 wherein the beam combiner is a Philips-type prism.

5. The display system of claim 1 wherein the three-point mounts permit thermal expansion of the display panels in a respective image plane.

6. The display system of claim 5 wherein, for each display panel, a first mount point is rigid in three orthogonal directions relative to the image plane, a second mount point is flexible in a first direction along the respective image plane and rigid in all other directions, and a third mount point is flexible in a second direction along the respective image plane and rigid in all other directions.

7. The display system of claim 6 wherein the first mount point is adjacent to both the second and the third mount points.

8. The display system of claim 1 wherein the three-point mounts are fixed to the beam combiner.

9. The display system of claim 1 wherein the three-point mounts are fixed to a supporting frame of the display system.

10. The display system of claim 1 wherein the beam combiner comprises at least two optical elements, each optical element interacting with an adjacent optical element at a unitary reflective surface.

11. A liquid crystal projection display system comprising:
    a plurality of liquid crystal display panels for generating respective images;
    a light source to direct light through each display panel;
    a beam combiner having a plurality of unitary reflective surfaces and an optical axis for optically combining the generated images to form a synthesized image;
    a plurality of mounts, each display panel fixed in an image plane relative to the optical axis of the beam combiner by a respective mount that permits thermal expansion of the display panel in the respective image plane; and an optical system for projecting the synthesized image onto a display surface.

12. The projection display system of claim 11 wherein there are three display panels, a first display panel generating a red-color image, a second display panel generating a green-color image, and a third display panel generating a blue-color image.

13. The projection display system of claim 11 wherein the display panels are active matrix liquid crystal display panels.

14. The projection display system of claim 11 wherein the beam combiner is a Philips-type prism.

15. The projection display system of claim 11 wherein the mounts are three-point mounts.

16. The projection display system of claim 15 wherein, for each display panel, a first mount point is rigid in three orthogonal directions relative to the image plane, a second mount point is flexible in a first direction along the respective image plane and rigid in all other directions, and a third mount point is flexible in a second direction along the respective image plane and rigid in all other directions.

17. The projection display system of claim 11 wherein a cavity between each display panel and the beam combiner is selected such that the displacement between the display panel and a position at optimal focus is less than 0.5 mm.

18. The projection display system of claim 15 wherein the three-point mounts are fixed to the beam combiner.

19. The projection display system of claim 15 wherein the three-point mounts are fixed to a supporting frame of the projection display system.

20. The display system of claim 11 wherein the beam combiner comprises at least two optical elements, each optical element interacting with an adjacent optical element at a unitary reflective surface.

21. A display panel registration apparatus comprising:

a plurality of display panels for generating respective images;

an optical combiner having an optical axis for optically combining the generated image to form a synthesized image; and a plurality of flexible mounts, each mount fixing a respective display panel in an image plane relative to the optical axis of the optical combiner so the generated images are registered to form the synthesized image, each mount arranged to permit movement of the respective display panel relative to the optical combiner during operation of the display panels.

22. A method of fixing a plurality of display panels which generate respective images relative to an optical combiner having an optical axis which forms a synthesized image from the generated images, comprising the steps of:

providing a plurality of flexible mounts;

aligning each display panel in a respective image plane relative to the optical axis of the optical combiner so the generated images are registered to form the synthesized image; and fixing the aligned display panels in the respective image planes using respective flexible mounts so that each mount permits movement of the respective display panel relative to the optical combiner during operation of the display panels.

* * * * *